Aug. 27, 1957 T. L. OGLEY 2,804,330
DOOR LOCKING DEVICE
Filed March 3, 1955 2 Sheets-Sheet 2
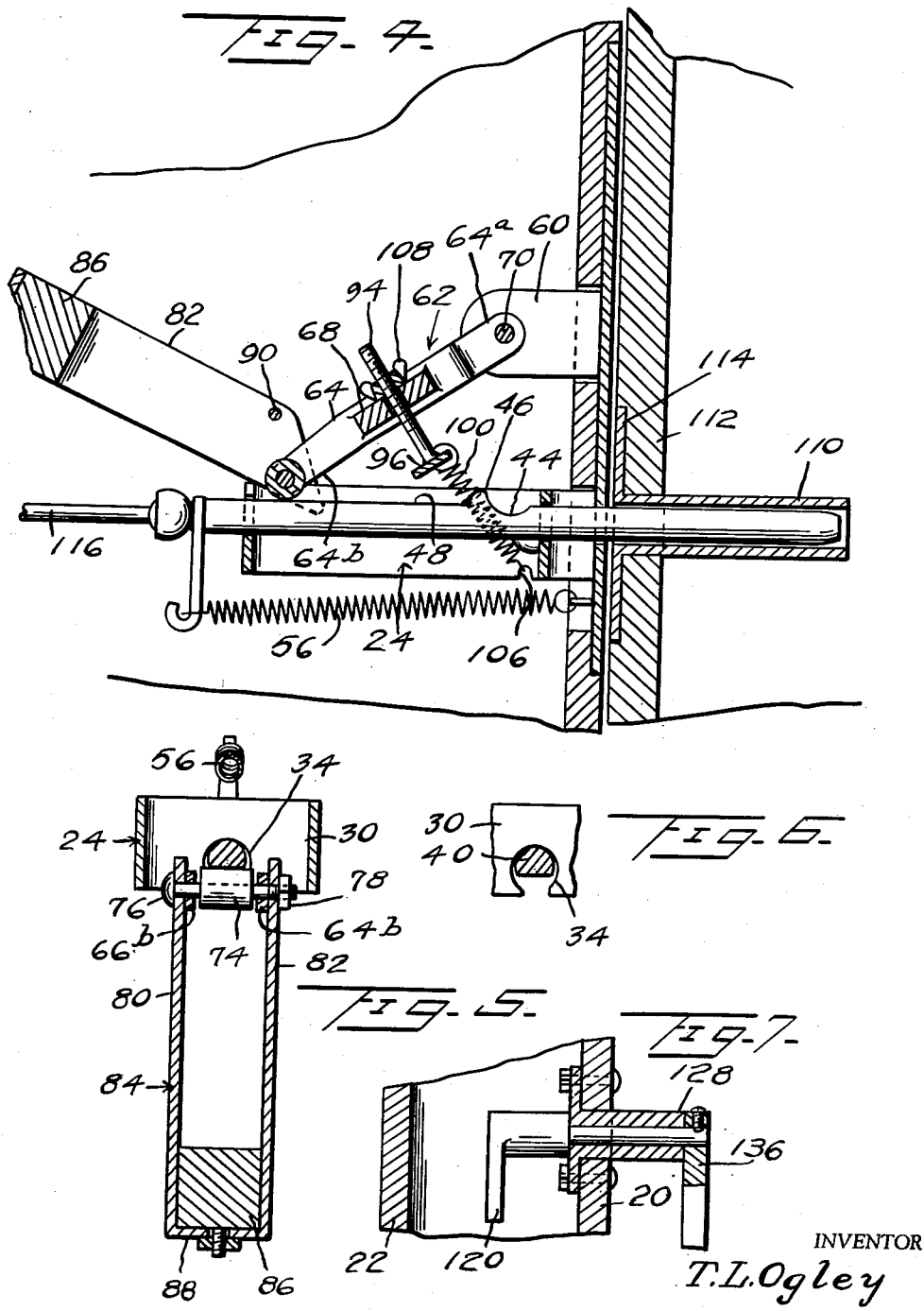
INVENTOR
T. L. Ogley
BY Kimmel & Crowell
ATTORNEYS

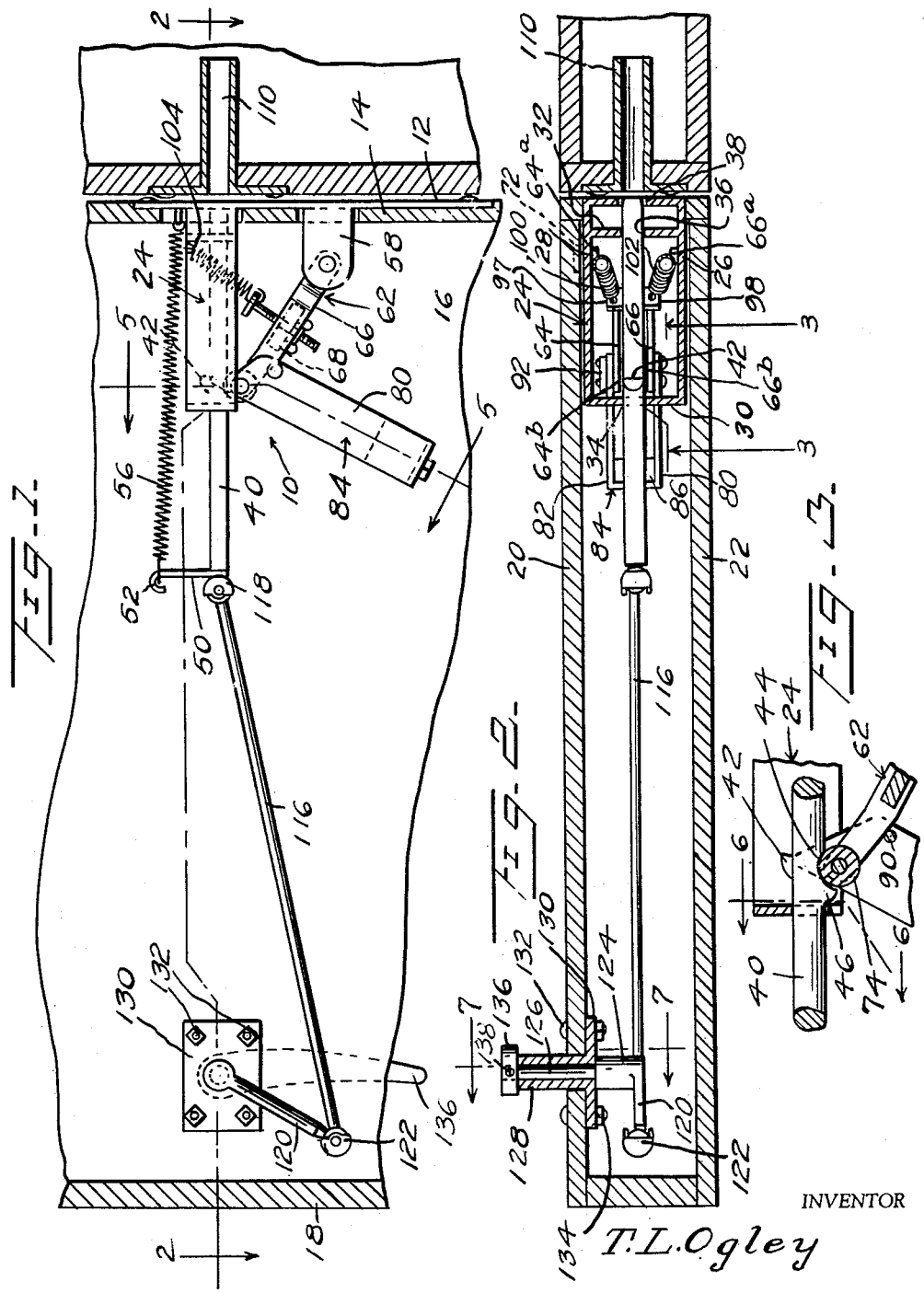

United States Patent Office 2,804,330
Patented Aug. 27, 1957

2,804,330

DOOR LOCKING DEVICE

Thomas L. Ogley, Sterling, Colo.

Application March 3, 1955, Serial No. 491,947

6 Claims. (Cl. 292—186)

This invention relates to locking mechanism, and more specifically, the invention pertains to a locking attachment for vehicles.

One of the primary objects of this invention is to provide a gravity operated safety lock for automotive vehicles.

Another object of this invention is to provide an automatically operating locking device which is actuated by the force of gravity.

A further object of this invention is to provide an automobile safety lock automatically triggered for movement into its locked position upon inadvertent or accidental turn or roll over of the automobile.

A still further object of this invention is to provide a safety lock of the type described with means for manually tripping the lock to its operative position.

This invention contemplates as a further object, the provision of a safety lock mechanism of the type to which reference has been made supra which is inexpensive to manufacture, assemble and maintain, non-complex in construction and installation, and durable in use.

Other and further objects and advantages of the instant invention will become more evident from a consideration of the following specification when read in conjunction with the appended drawings, in which:

Figure 1 is a side elevational view, partly in cross-section, illustrating the installation of the safety lock in a door of an automobile or other vehicle.

Figure 2 is a cross-sectional view taken on the horizontal plane of line 2—2 of Figure 1, looking in the direction of the arrows.

Figure 3 is an enlarged detail cross-sectional view taken on the line 3—3 of Figure 2, looking in the direction of the arrows.

Figure 4 is a longitudinal cross-sectional view of the locking mechanism illustrating the position of the several elements thereof after the car has rolled over and the lock has been tripped.

Figure 5 is a cross-sectional view taken on the line 5—5 of Figure 1, looking in the direction of the arrows.

Figure 6 is an enlarged detail cross-sectional view taken on the line 6—6 of Figure 3, looking in the direction of the arrows.

Figure 7 is an enlarged detail cross-sectional view taken on the line 7—7 of Figure 2, looking in the direction of the arrows.

Referring now more specifically to the drawings, reference numeral 10 designates, in general, an automobile safety door lock attachment constructed in accordance with the teachings of the present invention. The attachment 10 is seen to comprise a vertically elongated substantially rectangular support plate 12 which is secured to the lock end wall 14 of an automobile door 16 adjacent the lower end thereof. The door 16 includes, in addition to the lock side 14, the conventional butt end wall 18 oppositely disposed with respect to the lock end wall 14, and the spaced opposing inner and outer side panels 20 and 22, respectively.

A substantially U-shaped bracket member 24 having oppositely disposed spaced and substantially parallel arms 26, 28 and a bight wall 30 has the outer ends of its arms 26, 28 fixedly secured, as by welding, to the support plate 12 adjacent the upper end thereof to project laterally therefrom and inwardly of the door 16. A substantially rectangular spacer plate 32 having its opposite ends rigidly connected to the arms 26, 28 is positioned adjacent the support plate 12 in spaced substantially parallel relation. The bight wall 30, the spacer plate 32, and the support plate 12 are each provided with a transversely extending aperture 34, 36 and 38, respectively, the apertures being coaxially aligned with each other and serving as guide means for an elongated substantially cylindrical bolt 40 loosely mounted for reciprocation therein.

The bolt 40 is formed with an enlarged boss 42 positioned intermediate its ends and on the upper side thereof which comprise stop means engageable with the spacer plate 32 to limit the movement of the bolt 40 outwardly of the door 16. Substantially adjacent to and diametrically opposite the boss 42, the bolt 40 is formed with a transversely extending substantially arcuately shaped recess 44 having a transversely extending abutment 46 adjacent a side thereof. The bolt 40 is provided with a planar side 48 which extends from the flange 46 to the inner end thereof.

A substantially vertically extending standard 50 has its lower end rigidly secured to the inner end of the bolt 40 and its upper end terminates in a hook shaped member 52. The support plate 12 is provided with an inwardly extending laterally projecting hook 54 adjacent its upper end. The opposite ends of an elongated helicoidal spring 56 are connected with the hooks 52 and 54, the spring 56 constantly biasing the bolt 40 for movement outwardly of the door 16.

A pair of oppositely disposed spaced substantially parallel and apertured support members 58, 60 having a substantially rectangular configuration have one of their ends, respectively, fixedly secured to the support plate 12 below the U-shaped bracket member 24 in spaced relation relative thereto. A substantially Y-shaped yoke member 62 comprising a pair of elongated spaced substantially parallel side frame members 64, 66 connected intermediate their respective ends by a spacer block 68, has the diverging arms 64a, 66a thereof pivotally connected to the support arms 58, 60 on the bolt 70 releasably locked thereto by nut 72. The stem portions 64b and 66b of the yoke 62 are substantially parallel to each other and are centrally apertured adjacent their outer ends. A detent roller 74 is positioned intermediate the outer ends of the stem portions 64b, 66b and is mounted for rotation therebetween on a bolt 76 which extends through their respective apertures and is releasably secured thereto by a nut 78. The bolt 76 also serves to pivotally connect the outer ends of the elongated, spaced and parallel arms 80, 82 of a substantially U-shaped bracket 84 to the stem portions 64b, 66b of the yoke 62. A substantially rectangular block 86 is fixedly mounted on the bight wall 88 between the adjacent portions of the arms 80, 82. A bolt 90 extends across the outer ends of the arms 80, 82 and is fixedly secured thereto by nut 92, the bolt and nut serving to prevent the spreading of the arms outwardly and away from each other, and also serving as an abutment means to engage the yoke 62 and support the bracket 84 normally at an angle inclined to a vertical plane.

The spacer block 68 is provided with a substantially centrally located internally threaded opening adapted to threadedly receive one end of an externally threaded shaft 94. The other end of the shaft 94 is rigidly secured to a cross-head 96 intermediate the ends thereof, Apertures 97, 98 are formed in the cross-head 96, one being positioned each end thereof, and the apertures afford means for anchoring one end of a pair of helicoidal springs 100, 102 to the cross-head. The other ends of the helicoidal springs 100, 102 engage within notches 104, 106 formed in the upper ends of the arms 26, 28. A wing nut 108 mounted on the shaft 94 comprises means for adjusting the tension of the springs 100, 102.

An elongated, substantially hollow cylindrical bolt keeper 110 is mounted on the door jamb 112 by means of a facing flange 114, the keeper being coaxially aligned with the bolt 40.

In the assembly of this mechanism the wing nut 108 is tightened to tension the springs 100, 102 in such a manner as to force the detent roller 74 tightly against the planar surface 48.

An elongated rod 116 connects at one of its ends with a ball and socket connector 118 while the other end thereof is connected to one end of a link 120 through a second ball and socket connector 122. The other end of the link 120 is formed with a laterally offset substantially cylindrical boss 124 which has an outer cylindrical end portion 126 journalled in a cylindrical bearing 128. The bearing 128 is flanged at 130 and is secured to the inner door panel 20 adjacent the lower end thereof by bolts and nuts 132, 134. A manually operated bolt actuating handle 136 is fixedly secured to the reduced end portion 126 of the boss 124 as by set screw 138. The handle 136 is preferably spaced approximately eight inches above the lower end of the inner door panel 20.

Figures 1 and 2 illustrate the above described attachment as it appears in its set position. The bolt 40 has been retracted and the detent roller 74 is positioned in the recess 44 and abuts against the flange 46. Now assuming that the vehicle is involved in an accident and is overturned the force of gravity (see Figure 4) causes the U-shaped bracket 84 to pivot counter-clockwise to effect a sharp forceful engagement of the arms 80, 82 thereof against the bight wall 30. Under this force, the detent roller 74 is pivoted out of the recess 44 and escapes over the flange 46 under the tension of the spring 56. The bolt 40, now being free, snaps into the keeper 110 and locks the door against accidental opening.

It is well known among those who deal with traffic accidents that in collisions as described above, injuries and fatalities often result to the vehicle passengers due to the springing and opening of the vehicle doors through which the passengers are flung only to be crushed by the rolling vehicle. The safety means described above obviate these dangers.

To reset the safety lock, the operator turns the handle 136 to move the rod 116 laterally to the left as viewed in Figure 1 whereby the bolt 40 is retracted from its keeper 110 and the detent roller 74 is once again seated in the recess 44.

The planar side 48 of the bolt 40 cooperates with the detent roller 74 to prevent rotation of the bolt.

The recess 44 taken together with its adjacent flange 46 have a combined height which, with respect to the diameter of the detent roller and the loose fit of the bolt 40 in its guide openings, permit the safety lock to be activated by applying a sharp force to the handle 136.

Having described and illustrated one embodiment of this invention, it is to be understood that the same is offered merely by way of example, and that the invention is only to be limited by the scope of the appended claims.

What is claimed is:

1. A door locking device comprising a support plate adapted to be positioned in abutting relation with a door frame, a U-shaped bracket extending laterally from a side of said support member adjacent one end thereof, the bight of said U-shaped bracket and the supporting member each having an opening extending transversely therethrough, a spacer plate fixedly secured to said bracket and having an opening therein, said openings being aligned, an elongated locking bolt mounted for reciprocal movement within said aligned openings, said bolt having a laterally outwardly extending boss formed integrally on one side thereof and adapted to engage the spacer plate to limit the movement of said bolt in one direction, said bolt having a recess therein intermediate the ends thereof, said bolt having an arm extending laterally from said one end thereof, a helicoidal spring having an end thereof secured to said arm and its other end fixedly secured to said supporting member, said spring constantly tending to urge said bolt towards its extended locking position, a yoke having the arms thereof pivotally mounted on said support plate, a detent roller pivotally mounted on the free end of the stem of said yoke adapted for rolling engagement with said bolt, said roller seating in said recess and engaging said flange when said bolt is in its normal retracted position, a weighted U-shaped bracket having the arms thereof pivotally mounted on said free end of said yoke, means mounted on said arms of said last-named U-shaped bracket normally engaging said stem of said yoke for holding said last-named U-shaped bracket out of dead center position, resilient means connected to said yoke intermediate the ends thereof and with said first U-shaped bracket constantly biasing said detent roller into engagement with said bolt, said bolt being movable to its extended position upon pivotal movement of said last-named U-shaped bracket toward said bolt whereby said arms of said second bracket strike against said bight of said first bracket to effect a pivotal movement of said yoke away from said bolt to withdraw said detent roller from said recess thus releasing said bolt for extension thereof into locking position under the tension of said first spring.

2. A door locking device comprising a support plate adapted to be positioned in abutting relation with a door frame, a U-shaped bracket extending laterally from a side of said support member adjacent one end thereof, the bight of said U-shaped bracket and said supporting member each having an opening extending transversely therethrough, said openings being coaxially aligned, an elongated substantially cylindrical locking bolt loosely mounted for reciprocal movement within said coaxially aligned openings, means for limiting the movement of said bolt in one direction, said bolt having an arcuately shaped recess therein intermediate the ends thereof, resilient means constantly tending to urge said bolt towards its extended locking position, an elongated member having an end thereof pivotally mounted on said support plate, a detent roller pivotally mounted on a second end of said member, said roller seating in said recess when said bolt is in its normal retracted position, weight supporting means pivotally mounted on said second end of said elongated member, means mounted on said weight supporting means normally engaging said elongated member for holding said weight supporting member normally out of dead center position, and resilient means constantly biasing said detent roller into engagement with said bolt, said bolt being movable to its extended position upon pivotal movement of said weight supporting means toward said bolt whereby said weight supporting means strikes against the bight of said U-shaped bracket to effect a pivotal movement of said elongated member away from said bolt to effect withdrawal of said detent roller from said recess thus releasing said bolt for extension thereof into its locking position under the tension of said resilient means.

3. A door locking device comprising a support plate adapted to be positioned in abutting relation with a door frame, a U-shaped bracket extending laterally from a side of said support member adjacent one end thereof, a spacer plate interposed between the arms of said U-shaped bracket adjacent said supporting member, the bight of said U-shaped bracket, the spacer plate and the supporting member each having an opening extending transversely therethrough, said openings being coaxially aligned, an elongated substantially cylindrical locking bolt mounted for reciprocal movement within said coaxially aligned openings, means limiting the movement of said bolt in one direction, said bolt having an arcuately shaped recess therein intermediate the ends thereof, a flange extending transversely of said bolt adjacent said recess, resilient means constantly extending to urge said bolt towards its extended locking position, an elongated member having an end thereof pivotally mounted on said support plate, a detent roller pivotally mounted on an opposed end of said member adapted for engagement with said bolt, said roller seating in said recess when said bolt is in its normal retracted position, a second U-shaped bracket having the arms thereof pivotally mounted on said opposed end of said elongated member, means on said second U-shaped bracket engaging said elongated member for holding said second U-shaped bracket normally out of dead center position, a weight fixedly mounted on the bight of said second U-shaped bracket, and resilient means connected to said elongated member intermediate the ends thereof and with said first U-shaped bracket constantly biasing said detent roller into engagement with said bolt, said bolt being movable to its extended position upon pivotal movement of said second U-shaped bracket toward said bolt whereby said arms of said second U-shaped bracket strike against the bight of said first bracket to effect a pivotal movement of said elongated member away from said bolt to withdraw said detent roller out of said recess and over said flange thus releasing said bolt for extension thereof into locking position under the tension of said first resilient means.

4. A door locking device comprising a support plate adapted to be positioned in abutting relation with a door frame, a U-shaped bracket extending laterally from a side of said support member, the bight of said U-shaped bracket and the supporting member each having an opening extending transversely therethrough, said opening being coaxially aligned, an elongated locking bolt mounted for reciprocal movement within said coaxially aligned openings, means limiting the movement of said bolt in one direction, said bolt having a recess therein intermediate the ends thereof, said bolt having an arm extending laterally from said one end thereof, resilient means secured to said arm and to said supporting member, said resilient means constantly tending to urge said bolt towards its extended locking position, a Y-shaped yoke having the arms thereof pivotally mounted on said support plate, detent means mounted on the free end of the stem of said yoke adapted for engagement with said bolt, said roller seating in said recess when said bolt is in its normal retracted position, a substantially second U-shaped bracket having the arms thereof pivotally mounted on said free end of said yoke, means mounted on said arms of said last-named U-shaped bracket normally engaging said stem of said yoke for normally holding said last-named U-shaped bracket out of dead center position, a weight fixedly mounted on the bight of said last-named U-shaped bracket, and resilient means connected to said yoke intermediate the ends thereof and with said first U-shaped bracket constantly biasing said detent roller into engagement with said bolt, said bolt being movable to its extended position upon pivotal movement of said second U-shaped bracket toward said bolt whereby said arms of said second bracket strike against said bight of said first bracket to effect a pivotal movement of said yoke away from said bolt to withdraw said detent roller from said recess thus releasing said bolt for extension thereof into locking position under the tension of said first spring.

5. A door locking device comprising a support plate adapted to be positioned in abutting relation with a door frame, a U-shaped bracket extending laterally from a side of said support member adjacent one end thereof, the bight of said U-shaped bracket and the supporting member each having an opening extending transversely therethrough, said openings being coaxially aligned, an elongated locking bolt mounted for reciprocal movement within said coaxially aligned openings, means limiting the movement of said bolt in one direction, said bolt having a recess therein intermediate the ends thereof, said bolt having an arm extending laterally from said one end thereof, a helicoidal spring having an end thereof secured to said arm and its other end fixedly secured to said supporting member, said spring constantly tending to urge said bolt towards its extended locking position, a Y-shaped yoke having the arms thereof pivotally mounted on said support plate, a detent roller pivotally mounted on the free end of the stem of said yoke adapted for engagement with said bolt, said roller seating in said recess when said bolt is in its normal retracted position, a second U-shaped bracket having the arms thereof pivotally mounted on said free end of said yoke, means mounted on said arms of said last-named U-shaped bracket normally engaging said stem of said yoke for normally holding said last-named Y-shaped bracket out of dead center position, a weight fixedly mounted on the bight of said last-named U-shaped bracket, and resilient means connected to said yoke intermediate the ends thereof and with said first U-shaped bracket constantly biasing said detent roller into engagement with said bolt, said bolt being movable to its extended position upon pivotal movement of said second U-shaped bracket toward said bolt whereby said arms of said second bracket strike against said bight of said first bracket to effect a pivotal movement of said yoke away from said bolt to withdraw said detent roller from said recess thus releasing said bolt for extension thereof into locking position under the tension of said first spring.

6. A door locking device comprising a support plate adapted to be positioned in abutting relation with a door frame, a bracket extending laterally from a side of said support member adjacent one end thereof, said bracket and said supporting member each having an opening extending transversely therethrough, said openings being coaxially aligned, an elongated cylindrical locking bolt mounted for reciprocal movement within said coaxially aligned openings, said bolt having an arcuately shaped recess therein intermediate the ends thereof, resilient means under tension having an end thereof secured to one end of said bolt and its other end fixedly secured to said supporting member, said resilient means constantly tending to urge said bolt towards its extended locking position, a yoke having the arms thereof pivotally mounted on said support plate, a detent roller pivotally mounted on the free end of the stem of said yoke adapted for rolling engagement with said bolt, said roller seating in said recess when said bolt is in its normal retracted position, a bracket having the arms thereof pivotally mounted on said free end of said yoke, means mounted on said arms of said last-named bracket normally engaging said stem of said yoke for holding said last-named bracket out of dead center position, a weight fixedly mounted on the bight of said last-named bracket, and resilient means connected to said yoke intermediate the ends thereof and with said first bracket constantly biasing said detent roller into engagement with said bolt, said bolt being movable to its extended position upon pivotal movement of said second bracket toward said bolt whereby effecting a pivotal movement of said yoke away from said bolt to withdraw said detent roller from said recess thus releasing said bolt for extension thereof into locking position under the tension of said first spring.

References Cited in the file of this patent
UNITED STATES PATENTS
1,627,728    Conklin _____ May 10, 1927